UNITED STATES PATENT OFFICE.

THOMAS WEBBER AND CHARLES STEDMAN, OF CHICAGO, ILLINOIS.

IMPROVEMENT IN COMPOSITIONS FOR COVERING STEAM-BOILERS.

Specification forming part of Letters Patent No. 168,308, dated September 28, 1875; application filed August 21, 1875.

*To all whom it may concern:*

Be it known that we, THOMAS WEBBER and CHARLES STEDMAN, of Chicago, in the county of Cook and State of Illinois, have invented a new and valuable Improvement in Covering Steam-Boilers; and we do hereby declare that the following is a full, clear, and exact description of the same.

This invention has relation to a new and useful compound, which is designed for covering steam-boilers, steam-pipes, cylinders of steam-engines, heaters, &c., for the purpose of retaining heat and reducing condensation of steam produced by contact with the atmosphere.

The following is a description of the ingredients entering into our new compound, together with the proportions which we prefer to adopt:

Soot-ashes collected from the back-head of a boiler, sixty parts; rye-flour, fifteen parts; hydraulic cement or other cement, fifteen parts; flax-seed meal, ten parts; plastering-hair, or other fibrous material to bind the mass, in sufficient quantity.

Our process is to mix the several ingredients above named with hot or cold water to about the consistence of ordinary plastering-mortar, which is applied to the surface of the boiler or other object by giving it several coats, until the thickness of the covering is from one to one and a half inch. The final coat is made with paint, if it is required to render the covering water-proof.

We are aware that a composition for coating steam-boilers, flues, &c., consisting of charcoal, vegetable oil, coal-ashes, blue clay, sawdust, sisal and hair, and rye-flour, as described in Letters Patent granted to F. H. Snyder, dated June 29, 1869, has heretofore been employed, and we, therefore, lay no claim to such invention.

Having thus described our invention, what we claim as new, and desire to secure by Letters Patent, is—

The composition for coating steam-boilers herein described, composed of soot-ashes, rye-flour, hydraulic cement, flax-seed meal, hair, and water, mixed together in the proportions set forth.

In testimony that we claim the above we have hereunto subscribed our names in the presence of two witnesses.

THOMAS WEBBER.
CHARLES STEDMAN.

Witnesses:
ROBERT STEDMAN,
BENJ. CLARKE.